(12) United States Patent
Molaro et al.

(10) Patent No.: US 8,539,176 B2
(45) Date of Patent: Sep. 17, 2013

(54) DATA STORAGE DEVICES ACCEPTING QUEUED COMMANDS HAVING DEADLINES

(75) Inventors: Donald Joseph Molaro, Cupertino, CA (US); Frank Rui-Feng Chu, Milpitas, CA (US); Jorge Campello de Souza, Cupertino, CA (US); Atsushi Kanamaru, Sagamihara (JP); Tadahisa Kawa, Suita (JP); Damien C. D. Le Moal, Machida (JP)

(73) Assignee: HGST Netherlands B.V., Amsterdam (NL)

( * ) Notice: Subject to any disclaimer, the term of this patent is extended or adjusted under 35 U.S.C. 154(b) by 959 days.

(21) Appl. No.: 12/169,507

(22) Filed: Jul. 8, 2008

(65) Prior Publication Data

US 2010/0011149 A1   Jan. 14, 2010

(51) Int. Cl.
*G06F 12/00* (2006.01)

(52) U.S. Cl.
USPC ............. 711/158; 711/100; 711/151; 710/39; 710/40; 710/244

(58) Field of Classification Search
USPC .................... 711/158, 104, 102, 112, E12.96, 711/100, 151, 39, 40, 244
See application file for complete search history.

(56) References Cited

U.S. PATENT DOCUMENTS

| | | | |
|---|---|---|---|
| 5,528,513 A | | 6/1996 | Vaitzblit et al. |
| 5,787,482 A | * | 7/1998 | Chen et al. .................... 711/158 |
| 6,061,504 A | | 5/2000 | Tzelnic et al. |
| 6,223,249 B1 | | 4/2001 | Kato et al. |
| 6,639,885 B1 | | 10/2003 | Yada et al. |
| 6,690,882 B1 | | 2/2004 | Hanmann et al. |
| 6,697,958 B1 | | 2/2004 | Yada et al. |
| 6,721,859 B1 | | 4/2004 | Smyers |
| 6,754,155 B1 | | 6/2004 | Hayashi et al. |
| 6,947,354 B2 | | 9/2005 | Yada et al. |
| 6,950,381 B2 | | 9/2005 | Yada et al. |
| 6,999,389 B2 | | 2/2006 | Yada et al. |
| 7,035,984 B2 | | 4/2006 | Mastronarde et al. |
| 7,177,528 B1 | | 2/2007 | Yada et al. |
| 7,444,638 B1 | * | 10/2008 | Xu ............................... 718/104 |
| 2006/0059306 A1 | * | 3/2006 | Tseng .......................... 711/114 |
| 2008/0320241 A1 | * | 12/2008 | Dees et al. .................... 711/151 |
| 2009/0100433 A1 | | 4/2009 | Kang et al. |
| 2010/0011182 A1 | | 1/2010 | Le Moal et al. |

FOREIGN PATENT DOCUMENTS

WO   2004095254   11/2004

OTHER PUBLICATIONS

John Masiewicz, technical editor, "Information Technology—AT Attachment with Packet Interface—7 vol. 1—Register Delivered Command Set, Logical Register Set," Apr. 21, 2004, Revision 4b, vol. 1, pp. i-370.

Marc Noblitt, "Proposal for Streaming AV Commands," T13/D99123 revision 1, Aug. 23, 1999, pp. 1-13.

Darrin Bulik, "Proposal for Audio/Visual Feature Set," T13/D99128 revision 0, Aug. 24, 1999, pp. 1-16.

First office action for Chinese patent application 200910140130.4, counterpart to U.S. Appl. 12/169,318, State Intellectual Property Office, P.R. China, Jan. 31, 2011, pp. 1-19.

* cited by examiner

*Primary Examiner* — Jasmine Song

(74) *Attorney, Agent, or Firm* — Steven J. Cahill

(57) ABSTRACT

A data storage device accepts queued read and write commands that have deadlines. The queued read and write commands are requests to access the data storage device. The deadlines of the queued read and write commands can be advisory deadlines or mandatory deadlines.

18 Claims, 2 Drawing Sheets

| 0 | 1 | 2 | 3 | 4 | 5 | 6 | 7 |
|---|---|---|---|---|---|---|---|
| 1 | 0 | 1 | 0 | 1 | 0 | 0 | 0 |

| 0 | 1 | 2 | 3 | 4 | 5 | 6 | 7 |
|---|---|---|---|---|---|---|---|
| 1 | 0 | 1 | 1 | 0 | 1 | 0 | 1 |

DATA STORAGE DEVICES ACCEPTING QUEUED COMMANDS HAVING DEADLINES

BACKGROUND OF THE INVENTION

The present invention relates to data storage devices, and more particularly, to data storage devices that accept queued read and write commands having deadlines.

Data storage devices include hard disk drives, network storage devices, solid-state non-volatile memory devices (e.g., Flash memory), etc.

BRIEF SUMMARY OF THE INVENTION

According to some embodiments of the present invention, a data storage device accepts queued read and write commands that have deadlines. The queued read and write commands are requests to access the data storage device. The deadlines of the queued read and write commands can be advisory deadlines or mandatory deadlines. The present invention includes methods and systems for performing the embodiments described herein.

Various objects, features, and advantages of the present invention will become apparent upon consideration of the following detailed description and the accompanying drawings.

BRIEF DESCRIPTION OF THE DRAWINGS

FIG. 2A illustrates a first example of a command deadline that can be stored in an Isochroous Command Completion (ICC) register, according to an embodiment of the present invention.

FIG. 2B illustrates a second example of a command deadline that can be stored in an ICC register, according to an embodiment of the present invention.

DETAILED DESCRIPTION OF THE INVENTION

Figure 1:
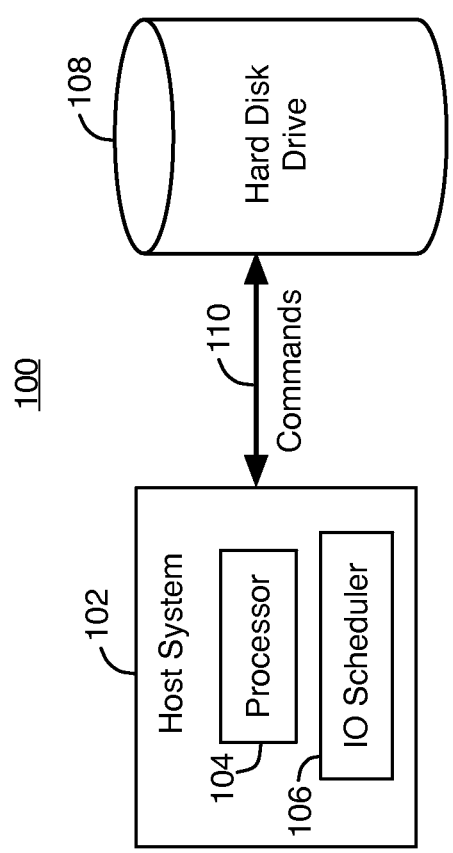
FIG. 1 is a block diagram that illustrates a system that can implement techniques of the present invention.

FIG. 1 is a block diagram that illustrates a system that can implement techniques of the present invention. The system 100 shown in FIG. 1 includes a host system 102 that includes a processor 104 and an input/output (IO) scheduler 106. The system 100 also includes a data storage device such as a hard disk drive 108 and a bus 110. Bus 110 connects host system 102 and hard disk drive 108. The host system 102 may be a DVR, set-top-box, or any other type of computer system, such as a personal computer, an embedded system, a minimalistic system, hand-held device or computer, etc. While the IO scheduler 106 is shown residing on the host system 102, the IO scheduler 106 may reside in any suitable location, separate from the host system 102 (e.g., on hard disk drive 108, etc.).

Host system 102 includes an operating system. The input/output (IO) scheduler 106 is located within the operating system layer and is typically responsible for deciding when to issue read and write commands to the hard disk drive 108. Read and write commands to access a data storage device, such as hard disk drive 108, are also referred to herein simply as commands. Processing these commands generates traffic to and from the hard disk drive 108.

In operation, the host system 102 sends commands to the hard disk drive 108 via the IO scheduler 106. The IO scheduler 106 is operable to receive the commands from the processor 104, and determine deadlines for each of the commands. Deadlines of read and write commands may also be determined by an application and passed down to the I/O scheduler through an appropriate operating system provided system call.

In some embodiments, the commands are for accessing the hard disk drive 108. For example, the commands include instructions for reading data from and writing data to the hard disk drive 108. As such, an IO scheduler 106 is operable to issue the commands to the hard disk drive 108 through bus 110. Bus 110 can be, for example, a Serial Advanced Technology Attachment (SATA) bus, a Small Computer System Interface (SCSI) bus, or any other suitable type of computer bus. The hard disk drive 108 then performs the requested commands.

Although the present invention disclosed herein is described in the context of hard disk drives, the present invention can apply to other types of data storage devices such as network storage devices, solid-state non-volatile memory devices (e.g., Flash memory), etc., and still remain within the spirit and scope of the present invention.

Electronic systems such as high-definition multi-room digital video recorders (DVR) are capable of simultaneously recording digital content from several sources, such as cable, satellite or over-the-air broadcasting tuners, while at the same time, allowing for the local playback of stored content and its streaming to other devices over a home network. Many of these devices also provide other types of applications such as digital photo storage and viewing, Internet browsing, email games, etc.

Recording and reading simultaneously multiple streams of high definition video, however, places huge demands on the system hard disk drive (HDD) and on the operating system storage stack (file system and an input/output scheduler). The required level of performance is often beyond the original design goals and usage purpose of general-purpose storage stacks. In addition to introducing severe performance limitations, the file system and input/output (IO) scheduler have no inherent ability to distinguish between a real-time streaming application, e.g. playing a movie, and a non-real-time best-effort task, e.g. viewing a photo. As a consequence, the on-time processing of time-critical disk read and write commands cannot be consistently guaranteed resulting in a poor quality of service (QoS) for video recording and playback.

Native Command Queuing (NCQ) is a technology that was designed to increase the performance of Serial Advanced Technology Attachment (SATA) hard disk drives under certain situations by allowing the individual hard disk drive to internally optimize the order in which received read and write commands are executed. NCQ can reduce the amount of unnecessary drive head movement, resulting in increased performance (and slightly decreased wear of the drive) for workloads where multiple simultaneous read/write commands are outstanding. SATA is a computer bus that transfers data between a host system and a data storage device.

According to some embodiments of the present invention, deadlines are added to SATA NCQ read and write commands sent to a data storage device to further improve the performance of the data storage device. The deadlines allow the data storage device to distinguish between real-time commands that have deadlines and non-real-time commands that do not have deadlines. The commands having deadlines are stored in a queue until the data storage device executes the queued commands. The commands with deadlines are transmitted to the data storage device through an interface, such as a SATA bus. The data storage device is configured to accept and execute queued commands that have deadlines. Because the commands having deadlines are stored in a queue, multiple commands having deadlines (e.g., up to 31 or more) can be outstanding in the queue at the same time. The commands can be ordered in the queue based on the timing of their deadlines.

The deadline information for isochronous data transfers can be transmitted to a data storage device as part of a read or write command. In a serial ATA (SATA) interface, the flag for identifying that a transfer is isochronous is indicated in bits 7-6, as 01b in a Sector Count (exp) register for NCQ commands (READ FPDMA QUEUED and WRITE FPDMA QUEUED) as an extension of the Priority Information field. If a command is marked by the host system as isochronous, the command has a deadline, and the data storage device attempts to complete the command before the deadline provided within the command. Each individual isochronous command can have a separate intended deadline.

The deadline is determined through use of an encoded value provided in the Isochronous Command Completion (ICC) field of a command. The Isochronous Command Completion field is in a byte wide ICC register, e.g., bits 16-23 of third DWORD of the Register Host to Device, for NCQ commands (READ FPDMA QUEUED and WRITE FPDMA QUEUED).

It is not required that data storage devices process isochronous commands before executing normal or high priority commands. Although there may be cases where an isochronous command is reaching its deadline, it may be feasible for a data storage device to service high priority commands prior to completion of an isochronous command. By default, when a deadline of a command has expired, the data storage device continues to complete that command as soon as possible. The host system is able to manage the system related global timeout. Thus, an optimal solution decouples the system global timeout and NCQ Streaming Deadlines.

The Isochronous Command Completion (ICC) field is assigned by host system 102 based on the intended deadline associated with the command issued. The encoded Isochronous Command Completion (ICC) value is set by the host system to inform the data storage device of the timer deadline value per given NCQ command. ICC is a byte wide register (e.g., having 8-bits using bits 16-23 of DWORD 3 of the Register Host to Device). If isochronous is not selected, then the data storage device ignores the ICC field.

FIG. 2A illustrates a first example of a command deadline that can be stored in an ICC register, according to an embodiment of the present invention. FIG. 2B illustrates a second example of a command deadline that can be stored in an ICC register, according to an embodiment of the present invention. FIGS. 2A-2B illustrate an 8-bit ICC register 201 that stores an 8-bit byte in binary form. The 8-bit byte stored in ICC register 201 indicates the deadline for a command to a data storage device. The 8-bit bytes stored in ICC register 201 in FIGS. 2A and 2B represent two deadlines for two different commands. Thus, the ICC register allows different commands to have different deadlines. Each number 0-7 on top of a square box of register 201 in FIGS. 2A-2B represents the address of the storage location where the bit in the square box is stored. The binary values shown inside ICC register 201 in FIGS. 2A-2B are merely example deadlines that are provided for the purpose of illustration and are not intended to limit the scope of the present invention to these particular values. According to additional embodiments, the ICC register can store more or less than 8 bits.

The ICC register has a specific encoding scheme. If ICC bit 7 equals 0, as shown for example in FIG. 2A, then fine encoding is set. Fine encoding can, for example, represent 10 milliseconds (msec) per interval. Using 10 milliseconds (msec) per interval as an example, the binary value stored in bits [6:0] of ICC register 201 is multiplied by 10 msec to generate the deadline for the command. The deadline for the command is set relative to the time the command was received by the hard disk drive. Using the example binary value 0010101 stored in bits [6:0] of ICC register 201 in FIG. 2A, 0010101 (21 in decimal) is multiplied by 10 msec to generate a deadline of 210 msec for the command. The maximum value that can be set for a command deadline using fine encoding in ICC register 201 is (ICC[6:0]+1)×10 millisecond (msec)=128×10 msec=1.28 seconds.

If ICC bit 7 equals 1, as shown for example in FIG. 2B, then coarse encoding is set. Coarse encoding can, for example, represent intervals of 0.5 second for bits [6:0], relative to the time the command was received by the hard disk drive. Using the example binary value 0101101 stored in bits [6:0] of ICC register 201 in FIG. 2B, 0101101 (45 in decimal) is multiplied by 0.5 second to generate a time of 22.5 seconds for the command. The maximum value that can be set for a command deadline using coarse encoding in the ICC register 201 is (ICC[6:0]+1)×0.5 second=64 seconds.

The Priority (PRIO) value is assigned by the host system based on the priority of the command issued. The data storage device may make a best effort to complete isochronous priority commands prior to their associated deadlines. The Priority values are defined as follows, 00b Normal Priority, 01b Isochronous—deadline dependent priority, 10b High priority, and 11b Reserved. If a data storage device does not complete a read or write command by its deadline, the data storage device does not dump the read and write commands stored in the queue of outstanding commands.

According to some embodiments of the present invention, some or all of the deadlines attached to the SATA NCQ commands are advisory deadlines (i.e., soft deadlines) that have a timeout. When the data storage device misses an advisory deadline for a command, (i.e., the timeout expires), the data storage device does not declare an error, and the queue of outstanding read and write commands is not dumped. In other words, the data storage device continues to execute the outstanding read and write commands stored in the queue. By default, when an advisory deadline for a command has been missed, the data storage device continues to complete the command having the missed deadline as soon as possible. Attaching advisory deadlines to commands that are sent through a SATA bus interface to a data storage device allows other SATA specifications to remain unchanged.

According to other embodiments of the present invention, some or all of the deadlines attached to the SATA NCQ commands are mandatory deadlines (i.e., hard deadlines). When the data storage device misses a mandatory deadline for a command, the data storage device does not execute that command, and the data storage device declares an error with respect to that command. However, the data storage device does not dump the queue of outstanding read and write commands. Thus, the data storage device continues to execute the outstanding read and write commands stored in the queue, except the command having the missed mandatory deadline.

Upon accepting the command, the data storage device clears a BSY bit if and when it is prepared to receive another command by transmitting a Register—Device to Host FIS to the host system with the BSY bit cleared in the Status field of the Frame Information Structure (FIS). The ability of the data storage device to quickly clear the BSY bit allows the host system to issue another queued command without blocking on this bit. The host system checks the BSY bit in the shadow Status register before attempting to issue a new command in order to determine whether the data storage device is ready to receive another command (and determine that the host system has write access to the Shadow Register Block Registers).

The data storage device does not trigger an interrupt in response to having successfully received the command, so the Register—Device to Host FIS that the data storage device transmits to clear BSY has the I bit cleared to zero.

The foregoing description of the exemplary embodiments of the present invention has been presented for the purposes of illustration and description. It is not intended to be exhaustive or to limit the present invention to the examples disclosed herein. In some instances, features of the present invention can be employed without a corresponding use of other features as set forth. Many modifications, changes, and variations are possible in light of the above teachings, without departing from the scope of the present invention. It is not intended that the scope of the present invention be limited with this detailed description. For example, embodiments of the present invention can be implemented using one or a combination of hardware, software, and a computer-readable medium containing program instructions. Software implemented by embodiments of the present invention and results of the present invention can be stored on a computer-readable medium such as memory, hard disk drive, compact disc (CD), digital video disc (DVD), or other media. Results of the present invention can be used for various purposes such as being executed or processed by a processor, being displayed to a user, transmitted in a signal over a network, etc.

What is claimed is:

1. A data storage device that accepts queued read and write commands, wherein at least a first one of the queued read and write commands has an advisory deadline, wherein the advisory deadline is a soft deadline having a timeout, and
wherein when the data storage device misses the advisory deadline for the first one of the queued read and write commands such that the timeout expires, the data storage device continues to complete the first one of the queued read and write commands having the missed deadline, and the data storage device continues to execute the queued read and write commands.

2. The data storage device defined in claim 1 wherein the data storage device is a hard disk drive.

3. The data storage device defined in claim 1 wherein each of the queued read and write commands has a deadline stored in an isochronous command completion register.

4. The data storage device defined in claim 3 wherein a bit in the isochronous command completion register indicates whether a deadline stored in the isochronous command completion register is a fine encoded deadline or a coarse encoded deadline.

5. The data storage device defined in claim 1 wherein the data storage device is a solid state non-volatile memory device.

6. The data storage device defined in claim 1 wherein each of the queued read and write commands has a deadline generated by a host system and transmitted to the data storage device through a SATA bus, and wherein the data storage device is a hard disk drive that implements native command queuing.

7. The data storage device defined in claim 1 wherein the data storage device accepts high priority commands that do not have deadlines.

8. A system that comprises code for accepting queued read and write commands for accessing a data storage device, wherein the code is stored on a non-transitory computer readable medium, wherein at least a first one of the queued read and write commands has an advisory deadline, wherein the advisory deadline is a soft deadline having a timeout, and
wherein when the data storage device misses the advisory deadline for the first one of the queued read and write commands such that the timeout expires, the data storage device continues to execute the queued read and write commands, and the data storage device continues to complete the first one of the queued read and write commands having the missed advisory deadline.

9. The system defined in claim 8 wherein the data storage device is a hard disk drive.

10. The system defined in claim 8 wherein each of the queued read and write commands has a deadline stored in an isochronous command completion register.

11. The system defined in claim 10 wherein a bit in the isochronous command completion register indicates whether a deadline stored in the isochronous command completion register is a fine encoded deadline or a coarse encoded deadline.

12. The system defined in claim 8 wherein the data storage device is a solid state non-volatile memory device.

13. The system defined in claim 8 wherein each of the queued read and write commands has a deadline generated by a host system and transmitted to the data storage device through a SATA bus, and wherein the data storage device is a hard disk drive that implements native command queuing.

14. The system defined in claim 8 wherein the code for accepting queued read and write commands for accessing the data storage device further comprises code for accepting high priority commands that do not have deadlines.

15. A method for improving performance of a data storage device, the method comprising:
accepting queued read and write commands for accessing the data storage device; and
executing the queued read and write commands,
wherein at least one of the queued read and write commands has a mandatory deadline, wherein when the data storage device misses the mandatory deadline for the queued read and write command having the mandatory deadline, the data storage device does not execute the queued read and write command having the mandatory deadline, and the data storage device declares an error with respect to the queued read and write command having the mandatory deadline, and
wherein executing the queued read and write commands comprises continuing to execute the queued read and write commands except the queued read and write command having the mandatory deadline after the data storage device misses the mandatory deadline, such that the data storage device does not dump the queued read and write commands.

16. The method defined in claim 15 wherein the data storage device is a solid state non-volatile memory device.

17. The method defined in claim 15 wherein the data storage device is a hard disk drive.

18. The method defined in claim 15 wherein each of the queued read and write commands has a deadline stored in a register generated by a host system, and transmitted to the data storage device through a SATA bus, and wherein the data storage device is a hard disk drive that implements native command queuing.

* * * * *